US012589367B2

(12) United States Patent
Wilsberg

(10) Patent No.: US 12,589,367 B2
(45) Date of Patent: Mar. 31, 2026

(54) DEVICE AND METHOD FOR GASSING A LIQUID

(71) Applicant: CETOTEC GMBH, Bad Honnef (DE)

(72) Inventor: Hans-Werner Wilsberg, Rheinbreitbach (DE)

(73) Assignee: CETOTEC GMBH, Bad Honnef (DE)

( * ) Notice: Subject to any disclaimer, the term of this patent is extended or adjusted under 35 U.S.C. 154(b) by 520 days.

(21) Appl. No.: 18/112,847

(22) Filed: Feb. 22, 2023

(65) Prior Publication Data

US 2023/0264153 A1 Aug. 24, 2023

(30) Foreign Application Priority Data

Feb. 22, 2022 (DE) ..................... 10 2022 104 181.6

(51) Int. Cl.
*B01F 23/233* (2022.01)
*B01F 27/111* (2022.01)

(52) U.S. Cl.
CPC .. *B01F 23/23342* (2022.01); *B01F 23/23365* (2022.01); *B01F 27/111* (2022.01)

(58) Field of Classification Search
CPC ........ B01F 23/23123; B01F 23/231231; B01F 23/231232; B01F 23/23342; B01F 23/23365
See application file for complete search history.

(56) References Cited

U.S. PATENT DOCUMENTS

| | | | | |
|---|---|---|---|---|
| 3,815,879 | A * | 6/1974 | Mikhailov | B01F 23/23342 261/84 |
| 4,193,950 | A | 3/1980 | Stockner et al. | |
| 2016/0244710 | A1* | 8/2016 | Wood | B01F 35/513 |

FOREIGN PATENT DOCUMENTS

| | | | |
|---|---|---|---|
| DE | 1 667 042 | A1 | 6/1971 |
| DE | 2 417 536 | A | 11/1974 |
| DE | 39 05 211 | A1 | 8/1990 |
| DE | 298 19 704 | U1 | 3/2000 |
| GB | 1135878 | A | 12/1968 |
| GB | 1414755 | A | 11/1975 |

* cited by examiner

*Primary Examiner* — Elizabeth Insler
(74) *Attorney, Agent, or Firm* — Pauley Erickson & Swanson

(57) ABSTRACT

A device for gassing a liquid, including a rotor, which is driven to rotate and has multiple vanes for conveying the liquid, and a stator, which surrounds the rotor and has a plurality of flow channels, which each extends starting from a radially inner inlet opening adjacent to the rotor through the stator to a radially outer outlet opening and are delimited along their length by side walls, bottom surfaces, and top surfaces and can be acted on with liquid by the rotor in the region of the inlet opening, wherein between the inlet opening and the outlet opening, the side walls and/or bottom and top surfaces of the flow channels have a multitude of gassing openings, which can be acted on with compressed gas from a compressed gas source in order to introduce this gas into the flow channels. A corresponding method for gassing a liquid is also disclosed.

10 Claims, 2 Drawing Sheets

DEVICE AND METHOD FOR GASSING A LIQUID

CROSS REFERENCE TO RELATED APPLICATION

German Patent Reference DE 10 2022 104 181.6, filed 22 Feb. 2022, the priority document corresponding to this invention, to which a foreign priority benefit is claimed under Title 35, United States Code, Section 119, and its entire teachings are incorporated, by reference, into this specification.

BACKGROUND OF THE INVENTION

Field of the Invention

This invention relates to a device for gassing a liquid, including a rotor that is driven to rotate around a vertical rotation axis and has multiple vanes for conveying the liquid and a stator that surrounds the rotor and has a plurality of flow channels, which each extends starting from a radially inner inlet opening adjacent to the rotor through the stator to a radially outer outlet opening and are delimited along their length by side walls, bottom surfaces, and top surfaces and can be acted on with liquid by the rotor in the region of the inlet opening.

This invention also relates to a method for gassing a liquid, in which a rotor that is driven to rotate around a vertical rotation axis and has multiple vanes conveys the liquid in flow channels of a stator surrounding the rotor, which flow channels each extend starting from a radially inner inlet opening adjacent to the rotor through the stator to a radially outer outlet opening and are delimited along their length by side walls, bottom surfaces, and top surfaces.

Discussion of Related Art

Devices and methods of the type mentioned at the beginning are known and are used, for example in the context of vinegar production, to introduce air into a vinegar fermenter that contains an aqueous alcohol solution that is transformed into vinegar by aerobic bacteria. These bacteria require a constant powerful supply of oxygen.

In order to be able to gas the liquid with a sufficient volume, for example in order to introduce oxygen into such an alcohol solution, there are known devices that have a rotor that is driven to rotate and has multiple vanes for conveying the liquid radially outward in a stator that surrounds the rotor. The stator has a plurality of flow channels through which the liquid flows, driven by the rotor.

From German Patent Reference DE 1 667 042 A1, it is known for the rotor, in addition to the liquid, to also automatically aspirate air and disperse it into the liquid that is to be aerated prior to its entry into the flow channels so that a liquid-air mixture with finely dispersed gas bubbles flows out from the flow channels.

From German Patent Reference DE 298 19 704 U1, it is also known to supply the gas, for example air, to the rotor via a duct and to mix it in the rotor with the separately aspirated liquid in order to then homogeneously disperse the resulting gas-liquid mixture via the flow channels of the stator. In known embodiments, the duct for the gas supply can also be connected to a compressed gas source in order to increase the air volume that is introduced.

From German Patent Reference DE39 05 211 A1 discloses a gassing device for liquids in which the gas is introduced into the liquid flow guided by the side walls as well as the bottom and top surfaces in accordance with the injector principle and is mixed with the liquid.

From German Patent Reference DE 24 17 536 A describes a device with a liquid reservoir and a stirrer that rotates around a vertical axis. A gas flow can be supplied below the stirrer.

SUMMARY OF THE INVENTION

In these known devices, it is disadvantageous for the mixing of the gas consents with the liquid to usually occur in the region of the rotor, such as before the gas-liquid mixture travels into the flow channels of the stator. This involves a considerable loss of flow energy so that devices of this kind cannot be operated in an energy-efficient way, a situation that would seem in need of improvement. Moreover, the amount of gas that can be introduced is limited, particularly in naturally aspirated devices. A simple blowing of compressed air into the liquid volume in the reservoir often turns out to be insufficient in the case of liquids where the need for gassing is critical, for example in the context of vinegar production, since it is not possible to achieve a uniform, finely dispersed gassing of the entire liquid volume.

If a naturally aspirated device is additionally acted on with compressed gas such as compressed air from a compressor in the region of the intake line, then increasing pressure is accompanied by a reduction in the delivery output of the rotor, which results in an undesirably high loss of drive energy of the rotor.

One object of this invention, therefore, is to propose a device and method of the type mentioned at the beginning, which overcome the disadvantages of the prior art and permit a particularly uniform and intensive gassing of a liquid with a low structural complexity.

To attain the stated object and others this invention proposes embodying a device as stated in this specification, and the claims including the dependent claims.

To attain the stated object, this invention proposes a device that is embodied in such a way that between the inlet opening and the outlet opening, the side walls and/or bottom and top surfaces of the flow channels have a multitude of gassing openings, which can be acted on with compressed gas from a compressed gas source in order to introduce this gas into the flow channels.

In the device according to this invention, the rotor serves only to convey the liquid into the flow channels and only in the flow channels is the liquid that is on the way from the inlet opening to the outlet opening acted on with the compressed gas of a compressed gas source, which travels through the gassing openings into the flow channels and mixes with the liquid there.

In the context of this invention, such an embodiment of the rotor exerts a particularly powerful delivery output and intensive stirring action on the liquid, but at the same time, can also introduce large volumes of gas into the liquid flowing through the flow channels. Then a very finely dispersed and homogeneous gas-liquid mixture comes out of the flow channels.

By contrast with the mixing of the gas and liquid parts in the—effective region of the rotor that is customarily used in the prior art, this mixing of the gas and liquid parts according to this invention is shifted into the region of the flow channels in which the liquid is conveyed by the action of the rotor. Energy losses in the region of the rotor drive are thus reduced significantly.

According to one embodiment of this invention, between adjacent flow channels of the stator, a respective dividing element is provided, which has side surfaces that each constitute at least a subsection of a side wall of one or both adjacent flow channels and the gassing openings are provided in the side surface.

In particular, it is preferable if the side surfaces of such dividing elements each constitute an entire side wall of the adjacent flow channels so that the stator features an embodiment in which flow channels arranged consecutively in a circle are divided by respective dividing elements, such as the flow channels and dividing elements alternate over the circumference of the stator, which is usually embodied as round.

According to one embodiment of this invention, the dividing elements can be embodied with an inner cavity, which communicates with the compressed gas source via corresponding supply lines, and a perforated plate having the gassing openings is accommodated in the side surfaces of the dividing elements. This makes it possible to achieve a particularly efficient production since the dividing elements can be correspondingly prefabricated to include the cavity. Depending on the design, corresponding perforated plates with a specifically calculated number and dimensioning of gassing openings are inserted into the corresponding recesses in the side surfaces. In its position in which it has been inserted into the recess, the perforated plate preferably constitutes a flush continuation of the surrounding side surface.

According to another embodiment of this invention, the gassing openings are preferably positioned adjacent to the outlet opening of the flow channels, such as they are positioned a greater distance from the inlet openings than from the outlet opening of the individual flow channels. The liquid flow through the flow channel produced by the rotor therefore has a chance to homogenize immediately after entering through the inlet opening before traveling past the gassing openings through which the compressed gas is introduced into the liquid.

According to another embodiment of this invention, the stator is composed of multiple parts and comprises a lower stator plate and an upper stator plate between which the dividing elements are positioned in a replaceable way. Such an embodiment simplifies the mechanical production of the stator and allows the dividing elements to be easily replaced, for example when they wear out. For example, they can be screw-mounted to the lower stator plate for this purpose. In any case in such an arrangement, the lower and upper stator plates constitute the respective bottom and top surfaces of the flow channels between the dividing elements, such as they cover them collectively at the respective top and bottom.

In addition, particularly in embodiments in which the dividing elements are replaceably fastened to the lower stator plate, this lower stator plate has a circumferential gas dispersion channel that is connected to a central gas inlet and communicates with the gassing openings via the individual dividing elements. Naturally, such an arrangement can also be provided in the region of the upper stator plate, wherein the dividing elements are then likewise fastened to the upper stator plate.

The dividing elements can have various suitable designs. In particular, the embodiment of the dividing elements in the form of a wedge is considered to be advantageous, wherein the tip of the wedge points toward the rotor.

The gassing openings can be dimensioned in accordance with the type and requirements of the liquid that is to be gassed and should have a diameter of preferably at most 1 mm in order to counteract the formation of undesirably large gas bubbles in the liquid. In addition, each flow channel can have a multitude of gassing openings, in particular between 200 and 2000 gassing openings, which are provided in and associated with the respective side walls and possibly also in the bottom surfaces and/or top surfaces of the flow channel.

Preferably, corresponding gassing openings are provided in both of the side walls, which face each other and delimit the flow channel, and possibly also in the region of the bottom surface and in exceptional cases, also in the region of the top surfaces.

Particularly when the device is used in the context of vinegar production, the device according to this invention can be provided with compressed gas in the form of air from a compressor, which thus serves as the compressed gas source.

The method for gassing a liquid according to this invention is based on the fact that a rotor that is driven to rotate and has multiple vanes conveys the liquid in flow channels of a stator surrounding the rotor. The flow channels each extend from a radially inner inlet opening adjacent to the rotor through the stator to a radially outer outlet opening and are delimited along their length by side walls, bottom surfaces, and top surfaces. According to this invention, gas from a compressed gas source is introduced into the flow channels from gassing openings in the side walls and/or bottom and top surfaces in the region between the inlet opening and the outlet opening and is mixed with the liquid flowing through the flow channels during its passage through the flow channels.

In addition, the gas can also be introduced into the flow channels transversely to the flow direction of the liquid in order to improve the thorough mixing.

BRIEF DESCRIPTION OF THE DRAWINGS

Other embodiments and details of the device and method according to this invention are explained below based on an exemplary embodiment. In the drawings, wherein.

DETAILED DESCRIPTION OF THE INVENTION

Figure 1:
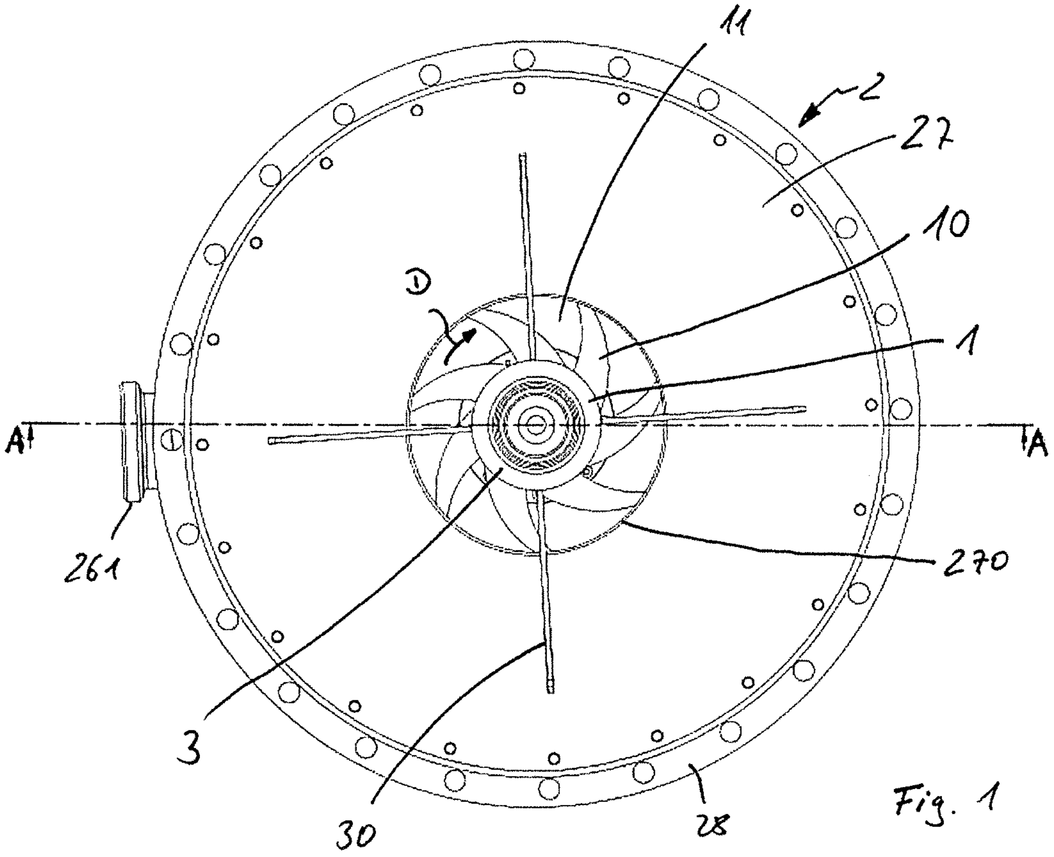
FIG. 1 shows a top view of a device according to this invention.
Figure 2:
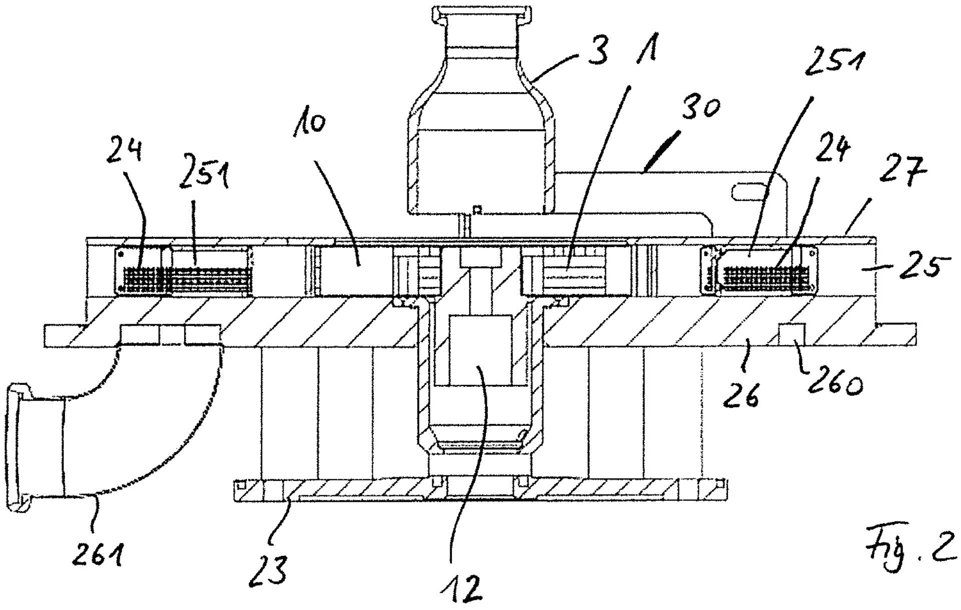
FIG. 2 shows a section along the line A-A through the device according to FIG. 1.
Figure 3:
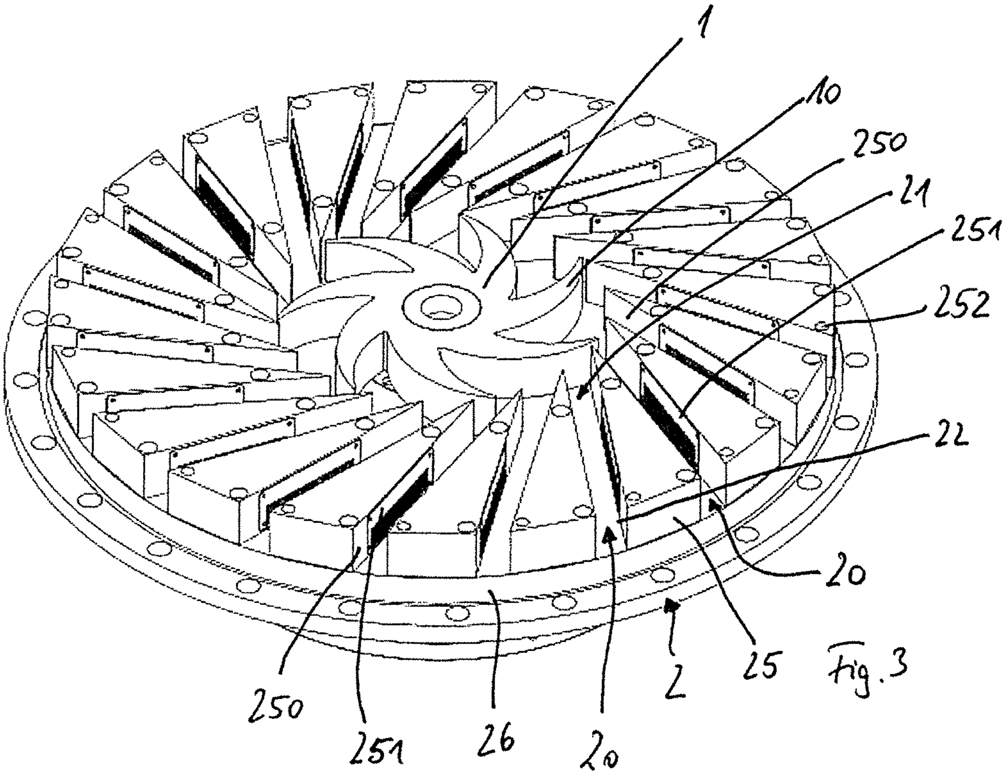
FIG. 3 is a perspective view of a partially disassembled device according to FIG. 1.

FIGS. 1 to 3 show a device for gassing a liquid, which can be used, for example, as an aerator for a vinegar fermenter in vinegar production.

The device comprises a rotor 1 that is driven to rotate by a drive motor, not shown, and has a plurality, in this case seven, vanes 10, which protrude radially along a curved path, and rotates in the rotation direction according to the arrow D shown in FIG. 1.

The rotor 1 is enclosed radially on the outside by a stator 2, which starting from a mounting flange 23 at the bottom, comprises a circular lower stator plate 26 and a likewise upper stator plate 27 between which a plurality of dividing elements 25 is provided, which have a wedge-shaped design and are embodied to match one another. They are spaced equidistantly apart from one another in a circle and fastened to the lower stator plate 26 in a replaceable way by screws 252, wherein each pair of adjacent dividing elements 25 forms a respective flow channel 20, which extends through the stator 2 from the inside to the outside.

Accordingly, each flow channel 20 comprises an inlet opening 21 adjacent to the rotor 1 and a radially outer outlet opening 22 and is delimited by side surfaces 250 of two adjacent dividing elements 25 that face each other serving as side walls and by the lower stator plate 26 serving as a bottom surface and the upper stator plate 27 serving as a top surface and in this respect, is open for the passage of a liquid through an inlet opening 21 and an outlet opening 22.

As particularly shown in the depiction in FIG. 1, the upper stator plate 27 of the stator 2 is embodied as ring-shaped and has a central through bore serving as a liquid inlet 270 through which the vanes 10 and the vane interstices 11 between the vanes 10 are accessible.

If such a device is built into a reservoir, for example a vinegar fermenter, then the device is positioned in the bottom region of the reservoir and can be fastened in a sealed fashion in a corresponding reservoir opening by a flange ring 28 correspondingly provided on the radial outside. The flange 23 that is then positioned outside the reservoir supports the drive motor, not shown here, whose drive shaft engages in the shaft socket 12 of the rotor 1 in order to drive the rotor 1 in accordance with the arrow D around a vertically extending rotation axis.

Due to the rotation of the rotor 1, liquid flows out of the reservoir through the liquid inlet 270 into the effective region of the rotating rotor 1 and is conveyed by the vanes 10 out from the vane interstices 11 into the individual flow channels 20 of the stator 2. The inlet openings 21 of the individual flow channels 20 can be positioned close to the circumference line of the rotor 1, which is generated by the rotation, and the tips of the wedge-shaped dividing elements 25 respectively point toward the rotor 1.

When the rotor 1 rotates, the device thus conveys a high volumetric flow of liquid through the liquid inlet 270 into the flow channels 20 until it reaches the outlet openings 22 thereof from which the liquid travels back into the reservoir and due to the circular arrangement of the individual flow channels 20, is dispersed homogeneously in the reservoir.

In order to be able to gas this liquid flow through the individual flow channels 20 with the desired gas volume, the side surfaces 250 of each dividing element 25, which each constitute one side wall of adjacent flow channels 20, are provided with an opening serving as a recess into which a corresponding perforated plate 251 is inserted, which constitutes a flush continuation of the side surface 250 of the dividing element 25.

Each perforated plate 251 is provided with a multitude of gassing openings 24 extending through the perforated plate 251, for example a hundred to a thousand of these gassing openings 24 arranged in a regular pattern are provided, which each have a diameter of less than 1 mm.

The dividing elements 25 in turn are embodied with an inner cavity, which communicates with the opening in the side surface 250, the perforated plate 251 accommodated therein, and the gassing openings 24 embodied therein. Through a central gas inlet 261 at the bottom, the gas that is provided for the gassing procedure can be supplied at high pressure from a compressed gas source, for example air from a compressor, and travels through a circumferential gas dispersion channel 260 in the lower stator plate 26 and corresponding connecting bores into each individual cavity of the dividing elements 25. From there, the gas travels through the gassing openings 24 in the respective perforated plates 251 into the individual flow channels 20. In this connection, the arrangement is selected so that the gassing openings 24 are positioned adjacent to the outlet opening 22 of each flow channel 20 and in this respect, are spaced a greater distance from the inlet opening 21, wherein the outlet direction of the gas from the gassing openings 24 extends transversely to the flow direction of the liquid in the flow channel 20.

Thus when the rotor 1 rotates in the arrow direction D and the vanes 10 convey liquid into the flow channels 20, this fluid flow, which initially arrives as a pure liquid flow through the inlet opening 21 into the flow channels 20, is acted on with the gas flow, which comes from the gassing openings 24 and extends transversely to the flow direction through the flow channel 20, only upon passing through the flow channel 20. Since the individual gassing openings are embodied with a small diameter of at most 1 mm, a gas volume is therefore introduced in a finely dispersed form into the individual partial flows of the liquid in the flow channels 20 and is intensively mixed with the liquid before the gas-liquid mixture produced in this way comes out of the outlet openings 22 of the flow channels 20 and into the reservoir.

It is thus possible, for example, for a reservoir containing 140 $m^3$ of liquid to be acted on with up to 1,500 $m^3$ of gas per hour in a finely dispersed forms, depending on the reservoir volume, liquid and gas can be dispersed in the liquid at a rate of about 6-12 $m^3/h$ of gas volume per cubic meter of reservoir volume.

In this connection, optimal use is made of the stirring action of the rotor and despite the high gas volumes introduced, it is nevertheless possible to achieve approximately 30 to 50% energy savings in comparison to conventional devices.

For example in a vinegar fermenter, in order to be able to disperse the alcohol quantity supplied to the reservoir as quickly as possible in the reservoir volume, a liquid inlet 3 is also provided centrally above the rotor 1 and the liquid inlet 270 in the upper stator plate 27, as can be seen in FIGS. 1 and 2, which inlet is mounted over the liquid inlet opening 270 by means of four vertically positioned mounting plates 30, which are spaced apart from one another by 90°. This liquid inlet 3 ensures that the supplied alcohol quantity travels directly to the rotating rotor 1 and from it, travels into the flow channels 20 and from there, is homogeneously dispersed in the reservoir. In addition, the vertically positioned mounting plates 30 also counteract the generation of an undesirable cyclone flow in the reservoir.

The device explained above is preferably made of corrosion-resistant metal and in particular, the finely dispersed gassing openings 24 in the perforated plates 251 can be produced by means of or with a laser.

The device and method are particularly suitable for aerating an alcoholic solution with air in the context of vinegar production, but can also be used for any other lipid-gassing tasks in which the homogeneous dispersion of large gas volumes in the transported liquid is desired.

While in the foregoing specification this invention has been described in relation to certain preferred embodiments, and many details are set forth for purpose of illustration, it will be apparent to those skilled in the art that this invention is susceptible tc additional embodiments and that certain of the details described in this specification and in the claims can be varied considerably without departing from the basic principles of this invention.

The invention claimed is:

1. A device for gassing a liquid, comprising a rotor (1) driven to rotate around a vertical rotation axis and having multiple vanes (10) for conveying the liquid and a stator (2)

that surrounds the rotor (1) and having a plurality of flow channels (20), which each extends starting from a radially inner inlet opening (21) adjacent to the rotor (1) through the stator (2) to a radially outer outlet opening (22) and are delimited along their length by side walls, bottom surfaces, and top surfaces and can be acted on with liquid by the rotor (1) near the inlet opening (21), comprising between the inlet opening (21) and the outlet opening (22), the side walls and/or bottom and top surfaces of the flow channels (20) having a multitude of gassing openings (24), which can be acted on with a compressed gas from a compressed gas source in order to introduce the gas into the flow channels (20); wherein between adjacent flow channels (20) a respective wedge-shaped dividing element (25) is provided, which has side surfaces (250) that each constitutes at least a subsection of a side wall of one or both adjacent flow channels (20) and the gassing openings (24) are provided in the side surface (250) and wherein a tip of each wedge-shaped dividing element (25) points toward the rotor (1).

2. The device according to claim 1, wherein the dividing elements (25) have an inner cavity, which communicates with the compressed gas source, and a perforated plate (251) having the gassing openings (24) is accommodated in the side surfaces (250) of the dividing elements (25).

3. The device according to claim 2, wherein the gassing openings (24) are positioned adjacent to the outlet opening (22) of the flow channels (20).

4. The device according to claim 3, wherein the stator (2) comprises a lower stator plate (26) and an upper stator plate (27) between which the dividing elements (25) are positioned in a replaceable way and the lower and upper stator plates (26, 27) form the respective bottom and top surfaces of the flow channels (20) between the dividing elements (25).

5. The device according to claim 4, wherein the lower stator plate (26) has a circumferential gas dispersion channel (260) that is connected to a central gas inlet (261) and communicates with the gassing openings (24).

6. The device according to claim 5, wherein the gassing openings (24) have a diameter of at most 1 mm and each flow channel (20) is associated with up to 2000 gassing openings (24).

7. The device according to claim 1, wherein the gassing openings (24) have a diameter of at most 1 mm and each flow channel (20) is associated with up to 2000 gassing openings (24).

8. The device according to claim 1, wherein the rotor (1) conveys the liquid into the plurality of flow channels (20) via the inner inlet openings (21) adjacent to the vanes (10) of the rotor (1).

9. The device according to claim 1, wherein the stator (2) includes an upper stator plate (27) including a liquid inlet (270), whereby the liquid flows through the liquid inlet (270) to the rotor (1) and is conveyed by the vanes (10) into the individual flow channels (20).

10. The device according to claim 9, wherein the rotor (1) conveys the liquid into the plurality of flow channels (20) via the inner inlet openings (21) adjacent to the vanes (10) of the rotor (1).

* * * * *